Sept. 29, 1931.  H. S. BAKER  1,825,382

MAGNETIC CLOCK ESCAPEMENT

Filed Jan. 25, 1927

Inventor
Henry Stevenson Baker
by
Harry P. Williams
Attorney

Patented Sept. 29, 1931

1,825,382

UNITED STATES PATENT OFFICE

HENRY STEVENSON BAKER, OF NIAGARA FALLS, ONTARIO, CANADA, ASSIGNOR, BY MESNE ASSIGNMENTS, TO ARTHUR K. KEMPTON, OF JACKSON HEIGHTS, NEW YORK

MAGNETIC CLOCK ESCAPEMENT

Application filed January 25, 1927. Serial No. 163,390.

This invention relates to a mechanism which is designed for operating and controlling timing instruments, and more especially to an escape mechanism in which there is no mechanical engagement whatever between the teeth of the escape wheel and the oscillatory pallets, as is the case with the common clock and watch escapements.

The object of the invention is to provide a comparatively simple, durable and reliable, electrically driven and magnetically controlled self synchronizing mechanism which may be used to measure or indicate any interval of time with such accuracy that any error will at the most be but a small fraction of a second.

In attaining this object, in the embodiment of the invention illustrated, the rotor of an electric motor is connected with and continuously turns an escape wheel having a plurality of poles of magnetic metal, which escape wheel is connected with a time train provided with the desired pointers or indicators. A magnet is mounted to oscillate with its field cut by the poles of the continuously rotating escape wheel, a balance spring or pendulum being connected with the magnet so that the magnet will be regularly oscillated by the varying magnetic impulses incident to the passing of the poles of the continuously rotated escape wheel through its field. With this arrangement the speed of rotation of the escape wheel is controlled, although turning freely, without the impacts and interruptions to movement which occur with a mechanically engaging escapement. Means may also be provided for quickly connecting the escapement with and disconnecting the escapement from the time train in order that the duration of actions may be accurately measured or indicated. The instrument may also be used to give electrical impulses at regular intervals.

Figure 1:
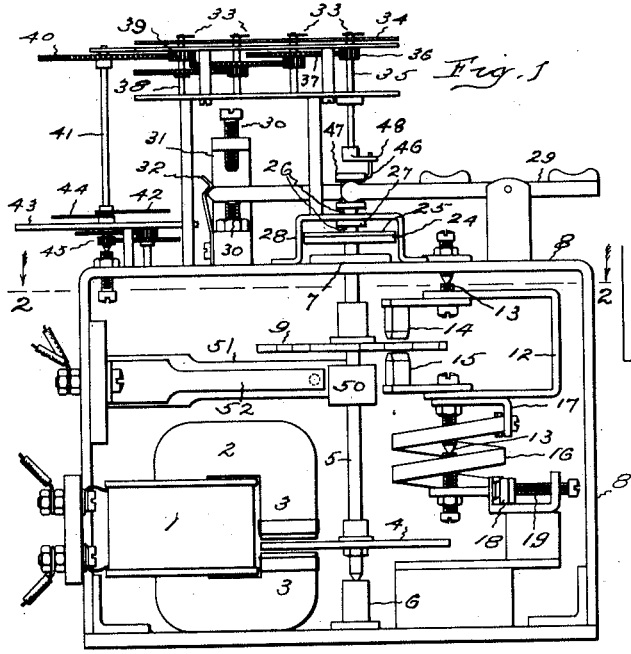
Figure 5:
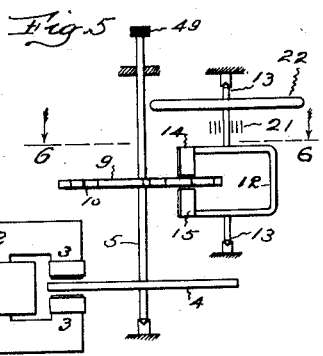
Figure 6:
Figure 2:
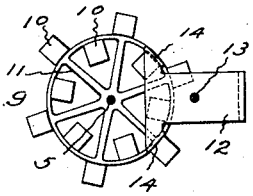
Figure 2:
Figure 2:
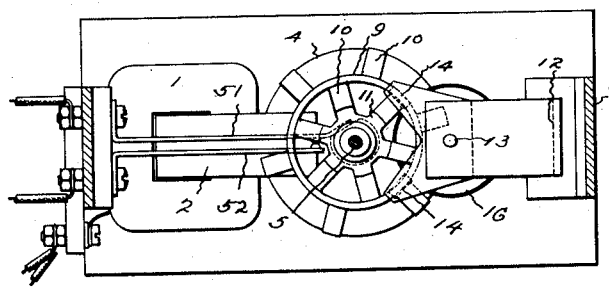
Figure 4:
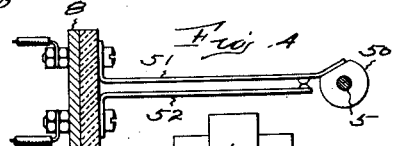
Figure 3:
Figure 3:
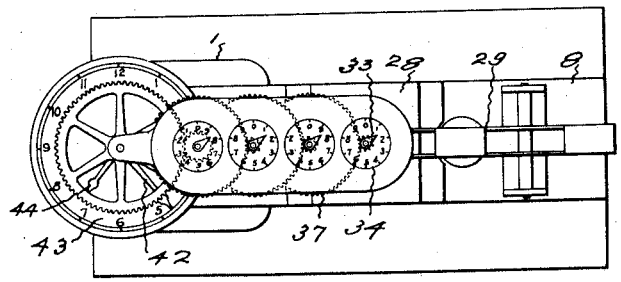
Figure 7:
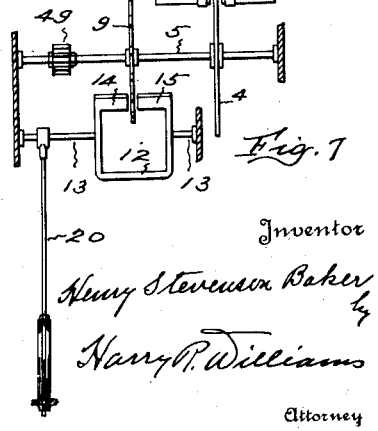

In the accompanying drawings Fig. 1 shows a side elevation of an escapement that embodies the invention and a time train which is driven thereby. Fig. 2 is a horizontal section on the plane indicated by the dotted line 2—2 on Fig. 1. Fig. 3 shows a top view of the instrument. Fig. 4 is a plan of a circuit make and break that may be used to give electrical impulses at regular intervals. Fig. 5 is a view of a simplified form of the escapement in which a hair spring and balance wheel are used to regulate the oscillations of the magnet. Fig. 6 shows a section on the plane indicated by the dotted line 6—6 on Fig. 5. Fig. 7 is a view illustrating the employment of a pendulum for regulating the oscillations of the magnet.

The driving motor of the instrument illustrated comprises a coil 1 on a core 2 having shaded poles 3 between which the rotor, that in the case shown is a copper disc 4, is given a continuous rotation by the magnetic effect induced by the flow of alternating current through the coil in the well-known manner. The rotor is fastened to an arbor 5 which is supported by bearings 6 and 7 on the frame 8.

The escape wheel 9 is fastened to this arbor and has a continuous rotation with the rotor. The escape wheel has a plurality of radially extending teeth 10 of magnetic metal, as soft iron, attached to or a part of a spider 11 that is secured to the rotor arbor. The magnetic teeth of the escape wheel are arranged to project alternately from the inside and the outside of the spider ring so that they will revolve concentrically with the rotor arbor, but one half in a path of one diameter and the other half in a circular path of another diameter.

Instead of the anchor with the usual pallets that make mechanical engagement with the teeth of the escape wheel, as in the common escapement, in the present invention a magnet 12 is mounted on pivots 13 so that its poles 14 and 15 will oscillate above and below the path of the teeth of the escape wheel, that is, so that the magnetic teeth of the escape wheel during their rotations will pass through the field of the magnet and be subject to the influence thereof. This magnet has two downwardly extending poles 14 above the escape wheel and two upwardly extending poles 15 below the escape wheel. With this arrangement as the escape wheel rotates and the magnet swings in one direction the magnet poles on one hand travel over and under an inside tooth of the escape wheel and the poles on the other hand travel over and under an outside tooth of the escape wheel, and then on the return swing of the magnet, the poles which acted on an inside tooth act on an outside tooth while the poles which acted on an outside tooth act on the following inside tooth of the escape wheel. As a result of this action, without touching the escape wheel and periodically stopping it, as is the case in the common mechanical escapement, the lines of force of the oscillating magnetic field acting on the magnetic teeth retard the escape wheel and require it to rotate at the desired speed. At the same time the magnet is kept in motion by the magnetic pull of the teeth of the escape wheel. The period of oscillation of the magnet may be controlled by a spring or by a pendulum. The spring 16 may, as illustrated in Fig. 1, have one end fastened to an arm 17 that is attached to the magnet, and the other end held by a clamp 18 that is controlled by a screw 19. When the clamp is loosened the tension of the spring may be adjusted by shortening or lengthening the coil. The pendulum 20 may be attached directly to one of the arbors of the magnet, as illustrated in Fig. 7. In the form illustrated in Fig. 5 a hair spring 21 is indicated as connected with the magnet arbor and a balance wheel 22 is shown as fastened on the arbor to stabilize the oscillatory movements of the magnet. In the embodiment of the invention illustrated the escape wheel has six exterior and six interior teeth and the magnet oscillation is six cycles per second. As a result of this particular design the rotor arbor has one revolution per second.

In the instrument first illustrated, fastened to the upper end of the arbor to which the rotor and escape wheel are secured, is a disk 24 which forms one member of a clutch. A disk 25 attached to a spindle 26 rotatable and slidable in a sleeve 27 carried by a yoke 28 fastened to the frame, forms the other member of the clutch. A lever 29 pivotally mounted on the frame is engaged with the spindle 26 in such manner that by manipulating the lever the disk 25 may be engaged with or disengaged from the disk 24 for the purpose of connecting or disconnecting the time train with the continuously revolving rotor arbor. Screws 30 may be turned in a bracket 31 to engage an end of this lever for limiting its movements in both directions, and a spring 32 may be arranged to contact with the end of the lever in order to retain it in the position to which it is moved, that is, with either the clutch engaged or disengaged.

The time or indicating train may be of any common and desired type. The time train illustrated has four pointers 33 adapted to turn over dials 34 each numbered from 1 to 10. The pointers are fastened to spindles 35 on which are pinions 36 that engage with gear wheels 37. The ratio of the pinions and gears is desirably such that it requires ten revolutions of a lower pointer for one revolution of the next higher pointer, this being a common meter arrangement. The last spindle 38 of the indicating train has a pinion 39 that engages with the gear wheel 40 on a shaft 41 which has a pointer 42. The ratio of this pinion and gear taken in connection with the one to ten ratios of the other pinions and gears of the train is such that the pointer 42 makes one revolution per hour over the clock dial 43. The pointer 44 is connected with the shaft 41 by the usual clock reduction gearing 45 so that it rotates over the clock dial once in twelve hours.

When the clutch members are engaged the pointers are revolved, being given a continuous movement from the continuously rotating rotor arbor, and when the clutch members are disengaged the pointers, of course, stop moving. By manipulating the lever the time or period of any action which is desired to measure may be obtained to a very small fraction of a second. For the purpose of connecting the spindle 26 with the spindle 35 so as to drive the gear train and yet allow spindle 26 a free longitudinal movement for the purpose of engaging and disengaging the clutch, a crank pin 46 may be arranged to project from the hub 47 on the spindle 26 into loose engagement with a crank arm 48 on the lower end of the spindle 35. If it is not desired to provide means for connecting and disconnecting the indicating train with the rotor, a pinion 49 adapted to engage with and turn a time or indicating train, may be fastened directly to the rotor arbor as shown in Figures 5 and 7.

For the purpose of obtaining a regular periodical series of electrical impulses from this instrument, a cam 50 may be fastened to the rotor arbor in position to engage a conducting finger 51 that is adapted to contact with a conducting finger 52, for opening or allowing the closing of a circuit with which these fingers are connected. As with the construction described the rotor shaft makes one revolution per second, the circuit controlled by this means will close once a second. These fingers are attached to, but insulated from the frame and are provided with any common means for the connection of circuit wires.

When a magnetic escapement embodying this invention is arranged with a counting or time train similar to that described and means are provided for connecting and disconnecting the train, any interval of time or length of any particular action may be measured or indicated with great accuracy even to a small fraction of a second. With this instrument the escapement when properly adjusted is self synchronizing, for any tendency of the rotor to run faster or slower than normal is accurately controlled by the oscillations of the magnet which hold the escape wheel in proper step, although there is no mechanical engagement or impact, which causes jar, wear and interruption of movement, between the escape wheel teeth and the oscillatory magnet pallets. While the escapement is particularly adapted to an instrument which can be used as described for timing actions to within a small fraction of a second, it, in its simplest form, is well adapted for escapements for common clocks designed to be electrically driven, or even clocks which are mechanically driven, as by the ordinary main springs.

The invention claimed is:—

1. A magnetic clock mechanism comprising a motor, an escape wheel provided with teeth of magnetic metal adapted to be revolved by said motor, and an oscillatory magnet with its field traversed by the teeth of the escape wheel, whereby the speed of rotation of the escape wheel is controlled by the magnet and the oscillations of the magnet are continued by the magnetic influence of the teeth of the rotating escape wheel.

2. A magnetic clock mechanism comprising a motor, an escape wheel provided with teeth of magnetic metal adapted to be revolved by said motor, and an oscillatory magnet with its poles located above and below the path traversed by the teeth of the escape wheel.

3. A magnetic clock mechanism comprising a motor, an escape wheel adapted to be revolved by said motor, said escape wheel having magnetic teeth arranged to revolve in a path of one diameter and magnetic teeth arranged to revolve in a path of a different diameter, and an oscillatory magnet with its field traversed by the teeth of the escape wheel.

4. A magnetic clock mechanism comprising a motor, an escape wheel provided with teeth of magnetic metal adapted to be revolved by said motor, an oscillatory magnet with its field traversed by the teeth of the escape wheel, and a balance spring connected to control the period of oscillations of the magnet.

5. An escape wheel for a magnetic clock escapement, comprising a support having teeth of magnetic metal arranged in the same plane on said support in circles of different diameters.

6. A magnet for a magnetic clock escapement, comprising an oscillatory permanent magnet having a pair of north poles spaced from each other and a pair of south poles spaced from each other, said north and south poles extending toward each other and providing a double field, means pivotally supporting said magnet and a spring attached to said magnet and controlling the period of oscillations thereof.

7. A magnetic clock escapement comprising a rotatable escape wheel provided with annularly located teeth of magnetic metal, and an oscillatory magnet provided with a pair of poles above and a pair of poles below and adapted to swing across the path of the teeth of the escape wheel.

8. A time train escapement comprising a magnetic escape wheel adapted to be continuously rotated, and a magnet pivotally mounted with its poles adjacent to said wheel whereby the magnet is adapted to be oscillated by and to regulate the rotation of the escape wheel.

9. A time train escapement comprising a rotatory magnetic escape wheel and an oscillatory magnet so relatively located that their magnetic forces react upon each other whereby the speed of rotation of the escape wheel and period of oscillation of the magnet are synchronized.

10. A time train escapement comprising a rotatable magnetic escape wheel, means for continuously rotating the wheel, and an oscillatory magnet with its poles arranged to oscillate adjacent to the magnetic escape wheel and through magnetic action control the speed of the escape wheel.

HENRY STEVENSON BAKER. [L. S.]